April 26, 1955
L. H. FLORA ET AL
2,707,013
BLIND FASTENING NUT
Filed March 8, 1954
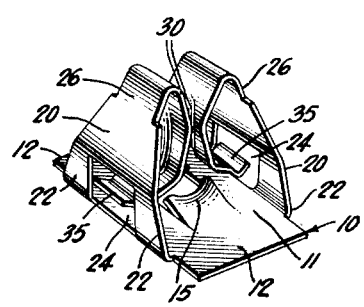
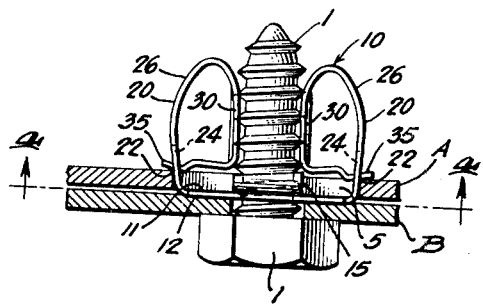
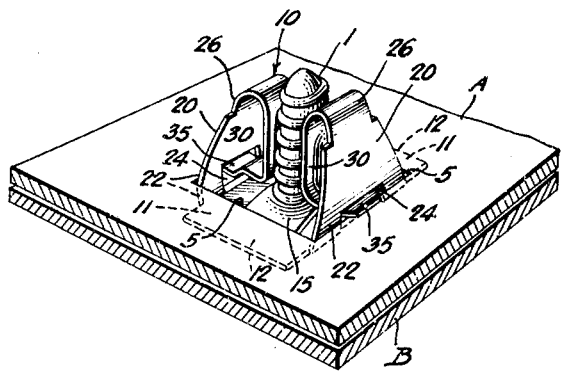
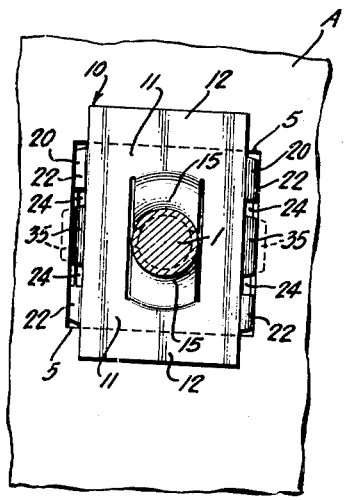
INVENTORS
LAURENCE H. FLORA
JOHN BALINT
BY *H. J. Lombard*
ATTORNEY

United States Patent Office 2,707,013
Patented Apr. 26, 1955

2,707,013

BLIND FASTENING NUT

Laurence H. Flora and John Balint, Cleveland, Ohio, assignors to Tinnerman Products, Inc., Cleveland, Ohio, a corporation of Ohio Application March 8, 1954, Serial No. 414,553

2 Claims. (Cl. 151—41.75)

This invention relates to fastening devices which are particularly suited for what are known as blind fastening assemblies wherein only one side of a supporting part is conveniently or readily accessible for attaching the fastening device and applying the associated bolt or screw thereto in securing one or more other parts of the assembly to said supporting part.

A primary object of the invention is to provide an improved fastening device of this character in a simplified one-piece sheet metal construction comprising a nut portion and an attaching portion adapted to be attached in a bolt or screw receiving opening in a part at the same side from which the bolt or screw is applied to said nut portion, and with said attaching portion comprising a pair of expansible and compressible arms adapted for snap fastening engagement in said opening to hold the fastening device in self-sustained fastening position on said part together with separate locking elements carried by said arms adapted to be expanded into positive engagement with said part adjacent said opening upon application of the associated bolt or screw to the fastening device in securing the parts of the assembly.

A further object of the invention is to provide such a fastening device in which the arms thereof are expansible into pronounced engagement with the wall of the opening in a supporting part upon application of the bolt or screw to the fastening device along with a simultaneous expansion of the separate locking elements carried by said arms into overlapping positive engagement with marginal portions of said part adjacent said opening, thereby providing the fastening device with extremely high resistance against pull-out or displacement from secured position in the opening in the supporting part.

Another object of the invention is to provide a sheet metal fastening device of the kind described in which the attaching arms of the fastening device include return bent inner leg portions having locking elements on the ends thereof aligned with passages in said attaching arms and adapted to be expanded by the bolt or screw to project through said passages into overlapping engagement with marginal portions of the opening in the supporting part to produce a positive lock of the fastening device in secured position in said opening.

Further objects and advantages and other new and useful features in construction and general combination of elements of the fastening device of the invention will be apparent as the following description proceeds with reference to the accompanying drawings, for purposes of illustration but not of limitation, in which like reference characters designate like parts throughout, and in which:

Fig. 1 is a perspective view of the improved fastening device of the invention;

Fig. 2 is a perspective view showing the fastening device as attached in an opening in a supporting panel and with a bolt or screw applied thereto to secure another panel to said supporting panel in a completed assembly;

Fig. 3 is a vertical sectional view of Fig. 2 wherein the fastening device is shown in edge elevational with the bolt or screw applied thereto; and, Fig. 4 is a sectional view on line 4—4 of Fig. 3, looking in the direction of the arrows, and shows in plan the base of the fastener with the bolt or screw applied to the thread engaging elements provided on said base of the fastener.

The fastening device of the invention is one of general utility and is readily adapted for use in a wide range and variety of applications for securing two or more parts of a fastening assembly, particularly in so-called blind locations. In this relation, the fastening device may be readily applied and secured entirely from the forward side of an assembly by attaching the same in an opening in one part to be secured where it will remain in self-sustained bolt or screw receiving position as said part is assembled with another part preparatory to the application of the associated bolt or screw to the fastening device to secure said parts in a completed assembly. In other instances, the fastening device is, likewise, applied from the forward side of an assembly of superposed parts having aligned openings in which the fastening device is attached in self-sustained position and serves as the means for holding said parts in assembled relation until the bolt or screw is applied thereto to secure said parts in a completed assembly. In any case, the application of the bolt or screw to the previously attached fastening device secures the same in the opening in the panel or other supporting part by the combined force of the attaching arms of the fastening device in expanded condition in the panel opening together with the separate locking elements carried by said attaching arms and expanded into overlapping positive engagement with marginal portions of said panel opening.

Referring now, more particularly, to the drawings, Fig. 1 shows a preferred form of the improved fastening device 10 which is preferably formed from a suitable blank of spring metal such as spring steel or cold rolled metal having spring characteristics. The blank may assume various forms but preferably is provided as a generally cross-shaped sheet metal section which defines a generally rectangular base 11 and lateral arm portions 20 extending from the sides of said base. The ends of said base project beyond said arm portions 20 and define the head portions 12 of the fastening device.

The central portion of the base carries means for threadedly engaging a bolt or screw, and in a preferred construction such thread engaging means are provided by integral tongues 15 stamped in said base portion 11. The thread engaging elements 15 are best provided from the sheet metal material of the base 11 by an aperture intermediate spaced parallel slits which form the cooperating tongues 15, or the like, having spaced extremities lying on a helix and defining the desired thread or thread opening corresponding substantially to the root of the bolt or screw 1 to be employed. Said tongues 15, otherwise, are preferably formed to project inwardly out of the plane of the base 11 and are bent lengthwise in substantial ogee formation to provide for the maximum strengeth obtainable to withstand the tightening action of the bolt or screw 1 as it is advanced to tightened fastening position.

Such thread engaging means may be pressed, stamped, extruded, or otherwise provided on the fastener base 11 in any suitable form or construction so long as the same threadedly engage with the thread of the bolt or screw 1 and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the wall thereof tapped to provide a plurality of threads for threadedly engaging the bolt or screw. However, such thread engaging means prepared in the form of cooperating, yieldable tongues 15, as shown, are possessed of unusual inherent strength and will not collapse or pull through when the associated bolt or screw is tightened, nor loosen under continuous strain and vibration in the completed installation. This takes place by reason of the fact that the sheet metal material from which such tongues 15 are formed is of less thickness than the pitch or spacing between adjacent thread convolutions of the bolt or screw 1, wherefore the extremities of said tongues 15 tend, more effectively, to move toward each other and dig into the grooves intermediate adjacent thread convolutions on the bolt or screw when tightened and otherwise become embedded in the root thereof in locked, frictional fastening engagement therewith. In the present example, the tongues 15 are shown as extending inwardly out of the plane of the base 11 in substantial ogee formation and provided preferably with arcuately notched extremities, forming substantial biting jaws adapted to cut into the root of the bolt or screw 1 and the adjacent thread surfaces thereon in a thread locking relation therewith in the most effective manner.

The arms 20 of the fastening device are bent to extend in the same general direction from said base 11 and adjoining said base, said arms 20 are formed in slightly diverging relation defining diverging cam shoulders 22. Said diverging shoulder portions 22 are provided with suitable slots 24 in the intermediate areas thereof adjoining the base 11 and these slots 24 define elongate transverse passages in said arms 20 for a purpose presently to be described. The diverging shoulders 22 merge with gradually converging guide portions 26 which taper inwardly toward each other to a spacing less than the width of the opening 5 in the supporting panel A so as to be readily received therein in the initial step of applying the fastening device to attached position in said panel opening 5.

The gradually converging guide portions 26 extend into return bent inner leg portions 30 which are disposed in opposing relation between the outer arm portions 20. Preferably said leg portions 30 are formed with lengthwise depressions to provide the same in the manner of longitudinal corrugations which strengthen and reinforce said leg portions 30 and define curved surfaces conforming substantially to the contour of the thread convolutions on the bolt or screw. The corrugated leg portions 30, thus provided, have a normal spacing less than the diameter of the bolt or screw 1 such that they are forced to expand when said bolt or screw passes therebetween.

The ends of said leg portions 30 are bent outwardly to provide outwardly extending locking elements in the form of locking feet or fingers 35 which are in line with the passages 24 in the outer arms 20 in position to pass through said passages 24 and project outwardly from said arms 20 when the bolt or screw 1 passes between said leg portions 30 to expand the same in the final securing of the fastening device. Said locking feet or fingers 35, when normally untensioned, extend outwardly in inclined relation, as seen in Fig. 1, and have their extremities slightly flared to facilitate the initial contact and movement thereof over the marginal portions of the panel opening 5 into engagement with adjacent surface portions of the panel A, as seen in Fig. 3.

The arrangement is such that in the application of the bolt or screw 1 to pass between the inner leg portions 30, said leg portions 30 and the locking feet or fingers 35 carried thereby are so expanded as to project the extremities of said locking feet or fingers 35 outwardly through the passages 24 in the outer arms 20 into positive overlapping engagement with the surface portions of the panel A adjacent the panel opening 5. The locking feet or fingers 35, otherwise, are so constructed as to be placed under a pronounced compression against the engaged surface portions of the panel A in a manner whereby said locking feet or flanges 35 are biased from their normal outwardly inclined relation, Fig. 1, to a substantially horizontal outwardly projecting relation, Fig. 3, when the bolt or screw 1 is driven home to fully tightened fastening position.

The fastening device 10 thus provided substantially as shown in Fig. 1, is readily attached in the opening 5 in the supporting panel A by a simple snap fastening action by which the fastening device is self-retained in initially attached position in said panel opening 5. While the panel opening may be provided in any suitable form, it is preferably provided as a generally rectangular opening 5 which is of a width slightly less than the spacing of the shoulders 22 on the arms 20, and of a length slightly larger than the widest portions of said arms 20 adjacent the head portions 12 of the fastening device. Accordingly, the fastening device 10 is readily attached in the panel opening 5 simply by inserting the arms 20 through the panel opening to a position in which the head portions 12 bear on the panel A adjacent said opening 5 while the cam shoulders 22 on said arms 20 engage opposing wall portions of said opening 5 in a snap fastening action by which the fastening device is self-retained in initially attached position in said panel opening 5. The fastening device 10 is then ready for the application of the bolt or screw 1 to secure a cooperating part B to the supporting part A as illustrated in Figs. 2 and 3.

In an alternate fastening procedure, the two or more parts A, B, to be secured, are arranged in superposed relation and the part B provided with a similar generally rectangular opening or other suitable opening which is aligned with the panel opening 5 in part A, whereupon the fastening device 10 is adapted to be inserted in such aligned openings to initially attached position, substantially as aforesaid, to serve as a means for holding the parts A, B, in assembled relation preparatory to the application of the bolt or screw 1 to the fastening device 10 to secure said parts A, B, in a completed assembly.

In securing an assembly of parts A, B, the bolt or screw 1 is threadedly engaged with the tongues or thread engaging elements 15 on the base of the fastening device and is advanced axially through the space between the inner leg portions 30 to spread said leg portions 30 from their normal relation shown in Fig. 1 to the expanded condition thereof seen in Figs. 2 and 3. The expansion of the inner legs 30 causes a proportionate expansion of the outer arms 20 to force the shoulder portions 22 thereon into a firm and rigid tensioned engagement with the adjacent wall portions and outer corner edges of the panel opening 5, thereby providing a pronounced locking action of the fastening device 10 in the panel opening 5 in this respect. At the same time, as the bolt or screw 1 expands the legs 30 and the locking feet or fingers 35 carried thereby, a much more positive and high strength locking action is provided by said locking feet or fingers 35 which are forced outwardly by such expansion through the passages 24 in arms 20 to overlapping engagement with the surface portions of part A adjacent the panel opening 5, Fig. 4, in a manner whereby said locking feet or fingers 35 provide the fastening device with extremely high resistance against pull-out or displacement from secured position in said panel opening 5. When the bolt or screw 1 is fully tightened as shown in Figs. 2 and 3, the locking feet or fingers 35 are under a pronounced compression against the portions of panel surface A engaged thereby, and to this end, said locking feet or fingers 35 are so constructed as to be biased from their normal outwardly inclined relation, Fig. 1, to a substantially horizontal outwardly projecting relation, seen in Fig. 3, in which said locking feet or fingers 35 have a pronounced positive locking action with the engaged portions of the panel A adjacent the opening 5 under continuously effective spring tension.

In the application of the bolt or screw 1, the thread thereon cuts into the curved surfaces of the longitudinally corrugated leg members 30 to provide a thread locking action on the bolt or screw 1 which, together with the thread locking provided by the thread engaging tongues 15, as aforesaid, retains the bolt or screw 1 in tightened fastening position against any unintended loosening. In this regard, a highly desirable advantage of the present invention resides in the fact the fastener 10 is so constructed as to engage the bolt or screw 1 in a manner to provide a locked positively secured assembly which is adapted to withstand shock and extreme vibratory motion as is necessary, for example, on certain parts of motor vehicles. This takes place through the use of thread engaging means such as the said tongues 15 which cut into the root of the bolt or screw 1 and adjacent thread surfaces thereon as such thread engaging tongues 15 otherwise are deformed into positively locked relation with the bolt or screw 1 when fully tightened.

Fastening devices in accordance with the invention are also highly advantageous in that they may be made more economically than most other expansible fasteners, inasmuch as they are constructed from a single section of sheet metal with the bolt or screw thread engaging elements 15 integrally provided thereon.

The fastening devices of the invention preferably are constructed of relatively thin sheet metal the thickness of which is selected according to service requirements and the predetermined size of the parts to be secured. The fastening devices are most effective when provided of spring metal suitably tempered and otherwise treated to give the desired toughness and hardness, particularly in the case of devices intended for heavy duty applications. A cheap and highly satisfactory fastening device may be provided from cold rolled metal such as cold rolled steel which is untempered but of a spring metal nature and capable of providing an effective and reliable fastening device as and for the purposes described.

While the invention has been described in detail with a specific example, such example is intended as an illustration only inasmuch as the invention fully contemplates various modifications which may be provided without departing from the spirit and scope of the invention.

What is claimed is:

1. A fastening device comprising a piece of sheet metal defining a base for engaging a piece of sheet metal defining a base for engaging a part to be secured and provided with an aperture and integral thread engaging means adjacent said aperture for threadedly engaging a bolt or screw, arms extending from said base in the same general direction and receivable in an opening in said part, said arms being provided with transverse slots adjacent said base and being bent back upon themselves to define a pair of expansible legs positioned inwardly of said arms and directed toward said base of the fastening device, said legs having a normal spacing less than the diameter of the bolt or screw and the ends of said legs being bent to provide locking feet extending outwardly in line with said slots in said arms, said legs being adapted to be expanded by said bolt or screw upon application of the bolt or screw to said thread engaging means, thereby projecting said locking feet on the ends of said legs outwardly through said slots in said arms into engagement with said part adjacent said opening therein.

2. A fastening device as claimed in claim 1 wherein the inner surfaces of said expansible legs are provided with lengthwise depressions defining stiffening corrugations for said legs.

References Cited in the file of this patent

UNITED STATES PATENTS

| | | |
|---|---|---|
| Re. 22,543 | Tinnerman | Sept. 5, 1944 |
| 2,208,779 | Tinnerman | July 1940 |